United States Patent
Pieciak et al.

(12)

(10) Patent No.: US 6,387,142 B1
(45) Date of Patent: May 14, 2002

(54) AIR/OIL SEPARATOR CAP ATTACHMENT SYSTEM

(75) Inventors: David P. Pieciak, Wilbraham; John E. Vogel, Southampton, both of MA (US)

(73) Assignee: Chicopee Engineering Associates, Inc., Chicopee, MA (US)

( * ) Notice: Subject to any disclaimer, the term of this patent is extended or adjusted under 35 U.S.C. 154(b) by 0 days.

(21) Appl. No.: 09/727,252

(22) Filed: Dec. 1, 2000

Related U.S. Application Data (60) Provisional application No. 60/212,289, filed on Jun. 19, 2000.

(51) Int. Cl.[7] .............................................. B01D 35/30
(52) U.S. Cl. .............................. 55/493; 55/498; 55/510; 55/360
(58) Field of Search ................................ 220/324, 326; 95/273; 96/155; 55/410, 492, 493, 505, DIG. 5, 490, 360; 210/232, 441, 442, 453, 454, DIG. 17

(56) References Cited

U.S. PATENT DOCUMENTS

| | | | |
|---|---|---|---|
| 2,660,315 A | * | 11/1953 | Lasky |
| 2,742,155 A | * | 4/1956 | Sather |
| 3,016,184 A | | 1/1962 | Hart |
| 3,018,535 A | | 1/1962 | Griffin |
| 3,040,974 A | | 6/1962 | Langdon |
| 3,499,270 A | | 3/1970 | Paugh |
| 3,673,643 A | | 7/1972 | Kindell |
| 3,944,107 A | | 3/1976 | Wallace et al. |
| 4,495,380 A | | 1/1985 | Ryan et al. |
| 4,577,756 A | * | 3/1986 | Hennessy et al. |
| 4,588,104 A | | 5/1986 | Danico |
| 4,710,852 A | | 12/1987 | Keen |
| 4,853,118 A | * | 8/1989 | Brownell et al. ............ 210/440 |
| 4,865,738 A | * | 9/1989 | Black, Jr. et al. |
| 4,871,455 A | * | 10/1989 | Terhune et al. .............. 210/232 |
| 5,006,238 A | * | 4/1991 | Tominaga .................... 210/169 |

(List continued on next page.)

*Primary Examiner*—Duane Smith
*Assistant Examiner*—Frank M. Lawrence
(74) *Attorney, Agent, or Firm*—Holland & Bozagni, P.C.; John A. Kramer, Esq.

(57) ABSTRACT

A cap attachment system for securely and electrically attaching the primary metal components of an air/oil separator to one another comprises a plurality of unique metal clips and mating retainer strips used in conjunction with a tubular, perforated metal cylinder, or "cage;" and two cap members, namely, a flanged ring top and an end cap. Three of the retainer clips, spaced equidistant as around a circle, are connected to an inner side of the cap, as are three additional clips connected to an inner side of the ring top. Three of the retainer strips, bent to have the same radius of curvature as the cage, are connected to an inner surface of the cage equidistantly along its bottom edge. Three more retainer strips are likewise connected to the inner surface of the cage along its top edge. The clips are positioned so that when the cage is brought to bear against the ring top and end cap (subsequent a pleated, outer separator element being concentrically disposed about an outer periphery of the cage and an inner separator element being concentrically positioned within the interior of the cage), the clips engage the retainer strips. In this manner, the cage is attached at its top end to an underside of the ring top and depends herefrom, and is attached at its bottom end to the end cap.

8 Claims, 6 Drawing Sheets

U.S. PATENT DOCUMENTS

| | | |
|---|---|---|
| 5,207,811 A | 5/1993 | Buonpastore |
| 5,246,357 A | 9/1993 | Sjoholm et al. |
| 5,347,690 A | 9/1994 | Mansoor et al. |
| 5,509,948 A | 4/1996 | Keller et al. |
| 5,556,542 A * | 9/1996 | Berman et al. ............. 210/441 |
| 5,589,060 A * | 12/1996 | Gebert et al. ............... 210/232 |
| 5,605,555 A | 2/1997 | Patel et al. |
| 5,695,633 A * | 12/1997 | Ernst et al. ................. 210/232 |
| 5,755,842 A | 5/1998 | Patel et al. |
| 5,800,581 A | 9/1998 | Gielink et al. |
| 5,826,312 A | 10/1998 | Schroder et al. |
| 5,887,319 A | 3/1999 | Smith |
| 5,891,337 A | 4/1999 | Keller et al. |
| 5,944,210 A | 8/1999 | Yetter |
| 6,010,320 A | 1/2000 | Kwon |
| 6,093,231 A * | 7/2000 | Read et al. .................... 55/498 |
| 6,257,417 B1 * | 7/2001 | Szumera ..................... 210/443 |

* cited by examiner

AIR/OIL SEPARATOR CAP ATTACHMENT SYSTEM

This application claims priority from a Provisional Application, Ser. No. 60/212,289, filed Jun. 19, 2000.

FIELD OF THE INVENTION

The present invention relates to air compressors, and, more particularly, to filters and air/oil separators.

BACKGROUND OF THE INVENTION

Oil-lubricated, rotary compressors are commonly used in industry and elsewhere to reliably produce large quantities of pressurized air. However, in these types of air compressors, the air, as it is compressed and passes through the compressor, comes into direct contact with the oil or other liquid (e.g., synthetic lubricant from a nearby reservoir) used to cool and lubricate the compressor's moving parts (e.g., a rotor with mounted vanes or a rotating screw). In doing so, an air/oil aerosol is formed, consisting of pressurized air interspersed with tiny particles or droplets of oil. To ensure that the pressurized air is relatively clean, as is required for most applications, the oil must be removed from the pressurized air prior to its being exhausted for use. Additionally, the separated oil can be channeled for re-use in the compressor.

Figure 1:
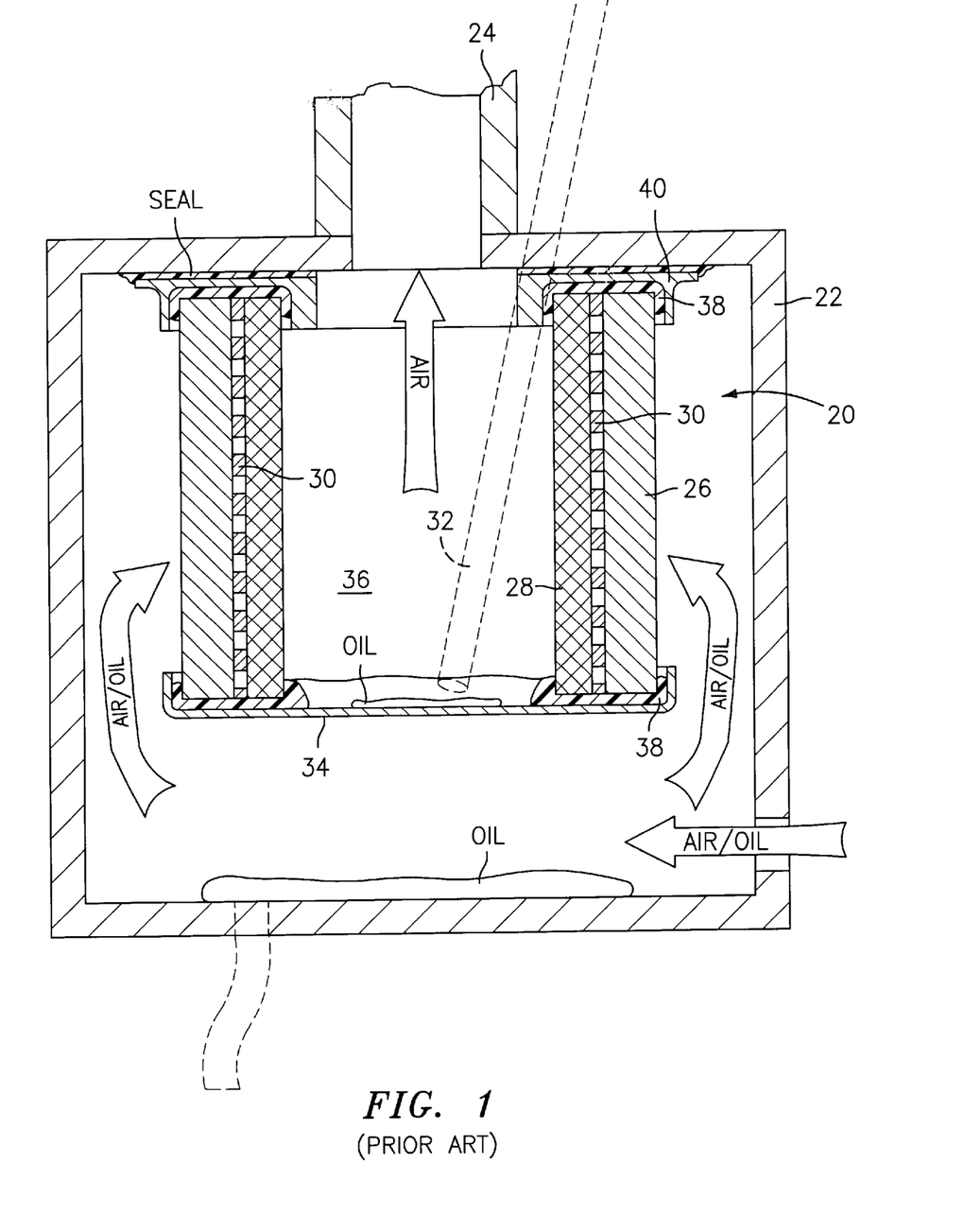
FIG. 1 is a cross-sectional view of an air/oil separator according to the prior art.

In order to separate the oil or other lubricant from the pressurized air, most rotary vane or screw compressors are provided with an air/oil separator 20, as shown in FIG. 1 (labeled "Prior Art"). The air/oil separator 20 is a compound, cylindrical, coalescing element that separates the oil from the compressed air. The air/oil separator 20 is attached to the inside of a separator tank 22, and is positioned such that the interior of the separator is in fluid communication with the compressor's air discharge or exhaust line 24. The compressed air/oil aerosol is routed into the separator tank 22 and through the air/oil separator 20, oftentimes after first passing through a baffle or other coarse separator that removes large particles of oil. The separator 20 is typically provided with an outer, tubular, coalescing separator 26, and an inner, concentric, tubular drain separator 28, the two being supported and/or separated by a concentric, tubular, perforated steel cylinder 30 (hereinafter referred to as the "cage" 30). Additionally, other filter or separator stages (not shown) may be provided. It should be appreciated that the separator 20 acts like a filter in the sense of removing oil from air. However, unlike a filter, where particles are trapped in the filter elements, the separator 20 coalesces oil, which then drains to the bottom of the separator 20.

The outer separator element 26 is typically composed of a fine fibrous separator media upon which the oil particles tend to coalesce. As oil particles build up, they move downwards, run together, and collect at the bottom end of the separator 20. The inner separator element 28 is typically composed of a coarser fibrous media, and is provided to facilitate oil drainage and to collect oil that gets re-suspended in the air flow downstream the outer filter 26. Oil that collects at the bottom of the separator 20 is collected for reuse via a scavenge line 32 extending into or through the tank 22.

As should be appreciated, in order for the separator 20 to strip the oil from the compressed air/oil aerosol, the aerosol must pass through the separators 26, 28. For this purpose, the bottom of the air/oil separator 20 is provided with an end cap 34. The end cap 34 blocks the bottom end of the separator's central cavity 36, and seals the bottom ends of the separators 26, 28. Without the cap 34, the aerosol would follow the path of least resistance by traveling directly through the separator's central cavity 36 and into the discharge line 24 without passing through the separators 26, 28.

Numerous methods have been used over the years to fasten the cap 34 to the bottom of the separator 20. Originally, as shown in FIG. 1, and as also shown in U.S. Pat. No. 6,093,231 to Read et al., the cap 34 was simply glued on via an epoxy 38 or the like. The epoxy, besides acting as a connector, also provided a seal between the cap 34 and the bottoms of the separators 26, 28. However, although this would work for a while, the cap 34 would still tend to fall off after a relatively short period of time. This is because the components in an air compressor, and especially the separator 20, are subject to a number of deleterious forces. For example, oil and other chemicals in the compressor tend to attack epoxy, especially if the compressor is left off for a while. Additionally, the separator 20 is subject to temperature changes during the compressor's duty cycle, and there is always the possibility of mechanical shock. Finally, when a check valve, a safety valve, or some other component of the compressor upstream from the separator 20 opens or fails (which happens relatively frequently), the separator is subject to a transient but high magnitude pressure differential or backlash. More specifically, in normal operation the pressure on the outer side of the cap is greater than the pressure on its inner side, helping the cap to stay in place. When the pressure suddenly drops on the outer side, the high pressure remaining on the inner side can literally blow the cap 34 off the end of the separator 20.

In the case mentioned above, using epoxy by itself left the cap 34 especially vulnerable to all the aforementioned forces. If the oil did not cause the cap to fall off by gradually degrading the epoxy, temperature or pressure differentials would. Of course, when the cap 34 fell or blew off, the air/oil separator 20 would have to be replaced before the compressor could be used again. Additionally, with epoxy separating the cap 34 from the rest of the separator 20, the cap would not be electrically grounded, raising the possibility of static discharge and fire.

To supplement the epoxy seal/connection, mechanical connectors or fasteners have been used in the past to connect the cap to the rest of the separator. For example, according to one method (not shown), the cage 30 was made wider and/or provided with end flanges, and the cap was riveted to the end of the cage 30. Although this functioned better than only using epoxy, the rivets were still subject to failure via chemical attack, plus it was difficult to provide rivet connections, considering the limited space, that were strong enough to withstand significant or repeated pressure differentials.

According to another method (not shown), metal straps were welded between the separator's flanged ring top 40 and the bottom of the cap. Such straps would typically not work very well because their weld connections would tend to fail subsequent periodic temperature fluctuations. Additionally, the straps would tend to bow axially inwards, preventing secondary components (other filter units, separators, etc.) from fitting into the separator's inner cavity 36, and it was effectively impossible to install such straps using an automated machine.

Other methods included using a central threaded rod, similar to the apparatus shown in U.S. Pat. No. 5,207,811 to Buonpastore, to connect the cap 34 to a cross brace placed across the ring top 40; and, as shown in U.S. Pat. No. 5,605,555 to Patel et al., providing a gripping surface for the sealing epoxy via dimples or similar features in the end cap 34 and ring top 40. Regarding the former method, secondary components could not be installed in the central cavity 36, and, regarding the latter method, the interconnections were still reliant on the efficacy of the epoxy, plus there was no effective grounding connection between the cap and the rest of the metal parts of the separator.

A final prior art design (not shown) involved the use of an outer cage connected to the outer periphery of the ring top 40 and crimped or flanged over the bottom periphery of the cap 34. Here, the cap 34 would still blow off from pressure backlash, mainly because the peripheral flange or crimping would fail, it generally being difficult to provide a cage strong enough to withstand large pressure differentials yet malleable enough to easily flange or crimp.

Accordingly, it is a primary object of the present invention to provide an improved system for attaching an end cap and a ring top to an air/oil separator, wherein said end cap and ring top are highly resistant to becoming detached via chemical corrosion or temperature or pressure differentials within the operating range of the air compressor.

Another object of the present invention is to provide a cap attachment system for an air/oil separator wherein all the metal parts are electrically connected for proper grounding.

Yet another object of the present invention is to provide a cap attachment system for an air/oil separator wherein the cap attachment system also serves to reinforce and maintain the shape of a cylindrical separator cage.

Still another object of the present invention is to provide a cap attachment system for an air/oil separator wherein the cap is easily attachable and wherein the separator can be automatically assembled by a machine.

SUMMARY OF THE INVENTION

An improved cap attachment system is disclosed for securely attaching the primary metal components of an air/oil separator to one another. In the preferred embodiment, the system's primary components comprise a plurality of unique metal clips and mating retainer strips. Other components (which existed previously) include a tubular, perforated metal cylinder, or "cage;" and two cap members, namely, a flanged ring top and an end cap.

Three of the retainer clips, spaced equidistant as around a circle, are connected to an inner side of the cap, as are three additional clips connected to an inner side of the ring top. Three of the retainer strips, bowed to have the same radius of curvature as the cage, are connected to an inner surface of the cage equidistantly along its bottom edge. Three more retainer strips are likewise connected to the inner surface of the cage along its top edge. The clips are positioned so that when the cage is brought to bear against the ring top and end cap, the clips engage the retainer strips. In this manner, the cage is attached at its top end to an underside of the ring top and depends therefrom, and is attached at its bottom end to the end cap.

Additionally, at some point prior to assembling the cage, end cap and ring top, a pleated, outer separator element is concentrically disposed about an outer periphery of the cage, and an inner separator element is concentrically positioned within the interior of the cage. Once the end cap and ring top are attached to the cage, the ends of the inner and outer separators lie within the confines of the ring top and end cap. The ends of the cage, the outer separator, and the inner separator are sealed against the ring top and end cap by an epoxy or the like disposed on the inner side of the end cap and ring top prior to or during assembly.

BRIEF DESCRIPTION OF THE DRAWINGS

These and other features, aspects, and advantages of the present invention will become better understood with respect to the following description, appended claims, and accompanying drawings, in which:

FIG. 2 (consisting of FIGS. 2A and 2B) is a perspective, exploded view of an air/oil separator utilizing a cap attachment system according to the present invention;

DETAILED DESCRIPTION OF THE PREFERRED EMBODIMENTS

Turning now to FIGS. 2–6B, preferred embodiments of an air/oil separator 50 and an air/oil cap attachment system (not separately numbered), according to the present invention, will now be given. The air/oil separator 50 comprises, in part, a flanged ring top 52; a tubular, perforated metal cylinder 54 (hereinafter referred to as the "cage" 54) attached at its top end to an underside of the ring top 52 and depending therefrom; and an end cap 56 attached to a bottom end of the cage 54 (note that the ring top and end cap may be individually or collectively referred to as a "cap member" or "cap members"). The cap attachment system comprises a plurality of metal clips 58a–58f connected to the ring top 52 and end cap 56, and a plurality of curved, metal retainer strips 60a–60f connected to the cage 54. When the cage 54 is brought to bear against the ring top 52 and end cap 56, the clips 58a–58f and strips 60a–60f engage, positively locking the respective components together.

Figures 2, 2A:
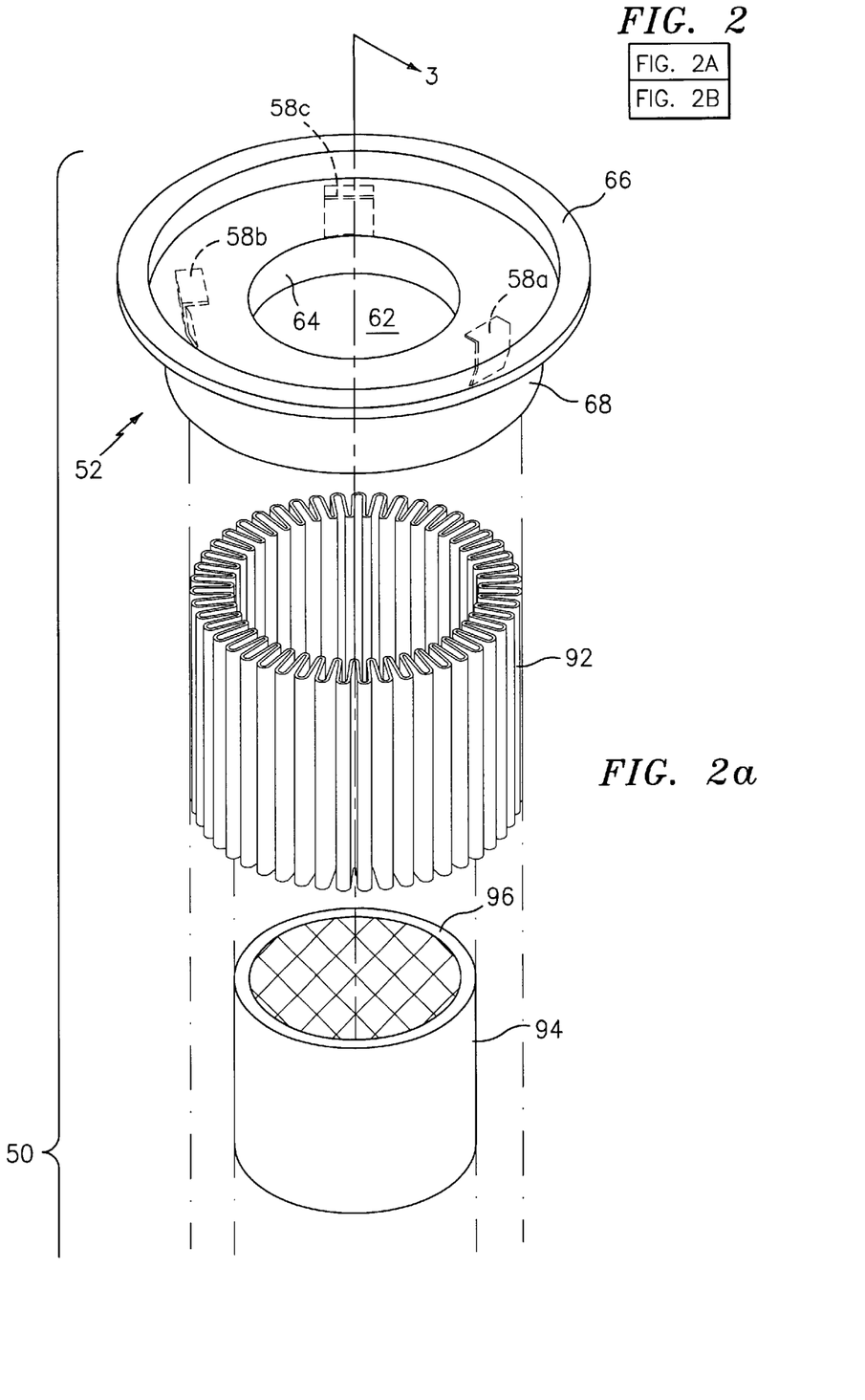
Figure 2B:
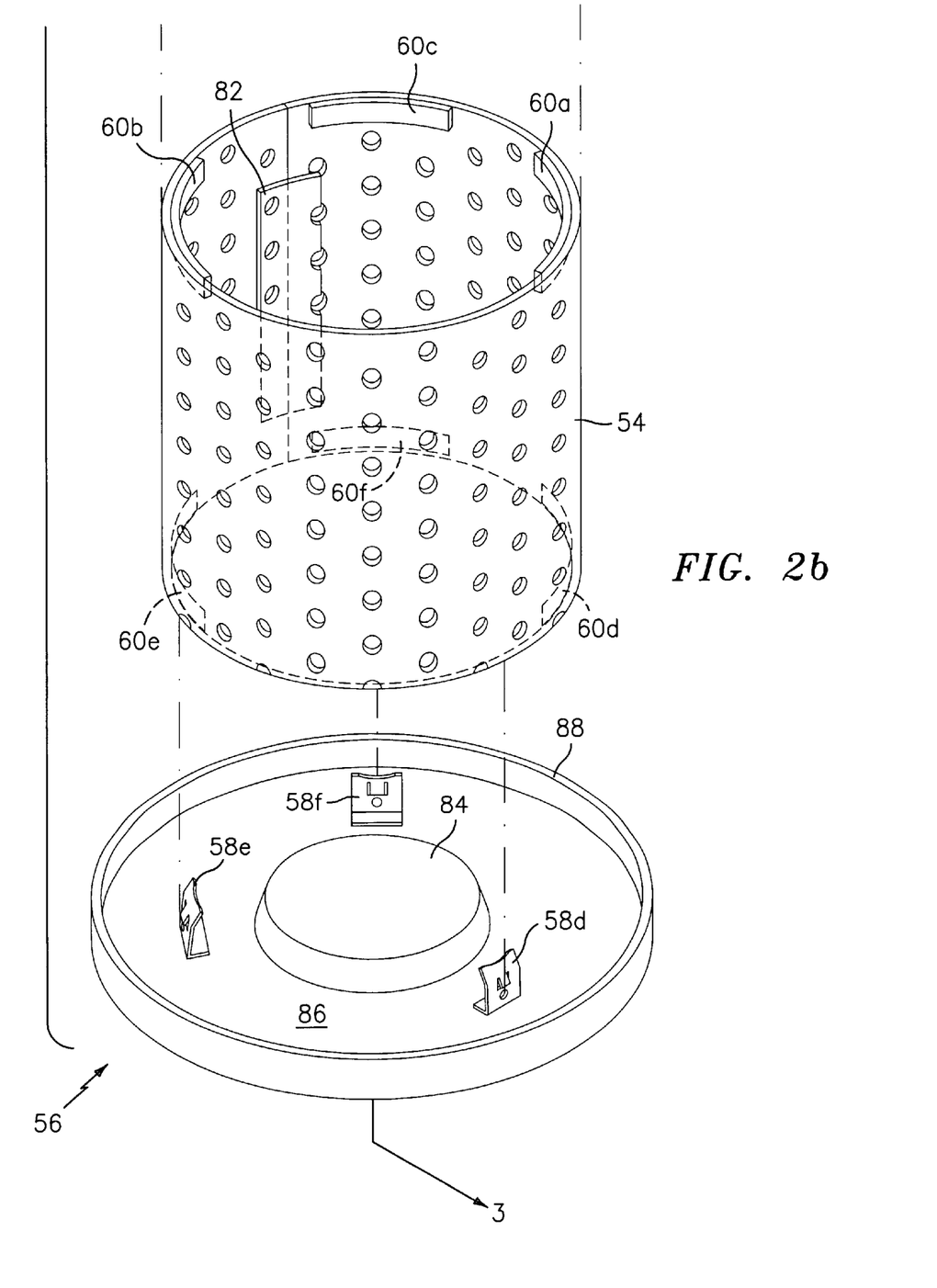

FIG. 2 shows the various components of the air/oil separator 50 prior to assembly. As mentioned immediately above, the primary metal components of the separator 50 are the ring top 52, the cage 54, and the end cap 56. The ring top 52 (also shown in partial cross-section in FIG. 4), as its name implies, has a circular, central aperture 62 defined by a downwardly turned, inner annular flange 64, as well as a peripheral, annular mounting flange 66. An outer skirt 68 is connected to the mounting flange 66, and depends therefrom. For attaching the ring top 52 to the cage 54, three of the metal clips 58a–58c are connected to an underside of the ring top 52. The clips 58a–58c are arranged concentrically, as around a circle, radially outwards from the inner flange 64. The clips 58a–58c are positioned equidistant (approximately 120°) from one another, and so that a flap portion 70 of each clip (further discussed below) faces radially outwards.

Figure 4:
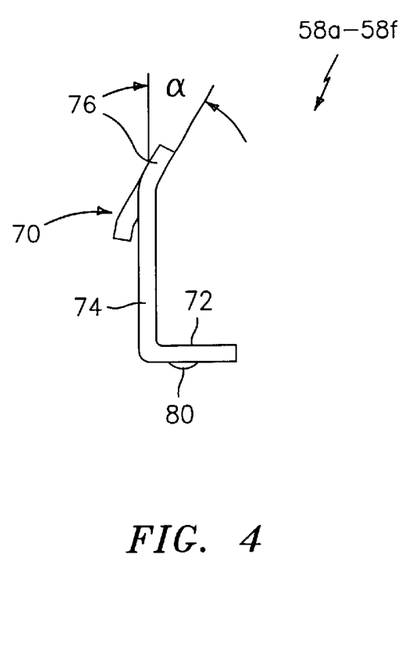
FIG. 4 is a side elevation view of a clip.
Figure 5:
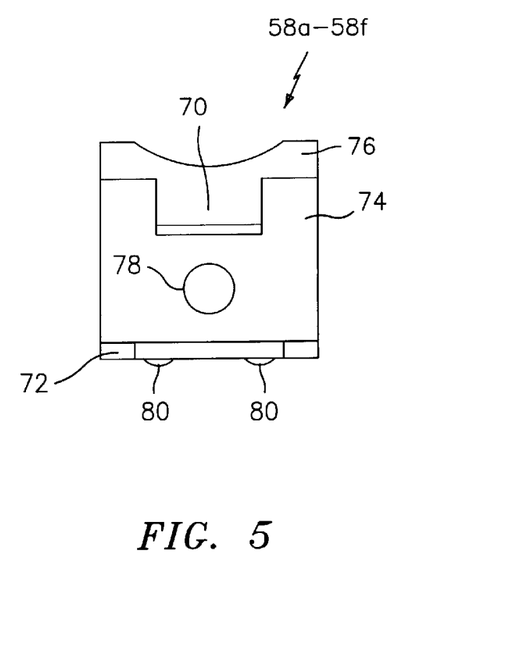
FIG. 5 is a front elevation view of the clip shown in FIG. 4.

FIGS. 4 and 5 show the clips 58a–58f in detail. Each clip is a generally L-shaped (in cross-section) metal piece comprising a generally rectangular base 72 connected at an angle (approximately 90°) to a central body 74. A guide flange 76, connected to the body 74, is bent back towards the base 72 at approximately a 30° angle α. Additionally, the flap 70, generally rectangular-shaped and formed by partially punching out an upper mid-portion of the body 74, is connected to a middle bottom of the guide flange 76. The flap 70 is oriented to generally align with the guide flange 76. A circular guide aperture 78, useful for helping with manual or automated assembly, may be disposed in a lower midportion of the body 74. Finally, an underside of the base 72 may be provided with weld bumps 80 for facilitating quick and/or automated spot welding.

Figure 6A:
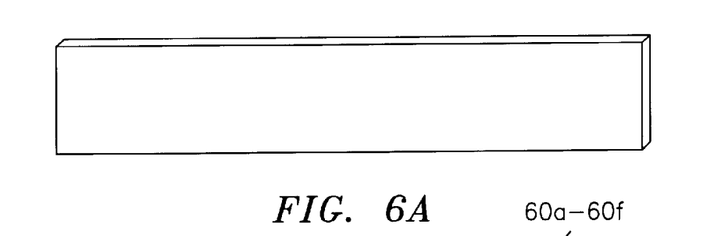
FIGS. 6A and 6B are perspective views of a retainer strip blank and a curved retainer strip made from the retainer strip blank, respectively.
Figure 6B:
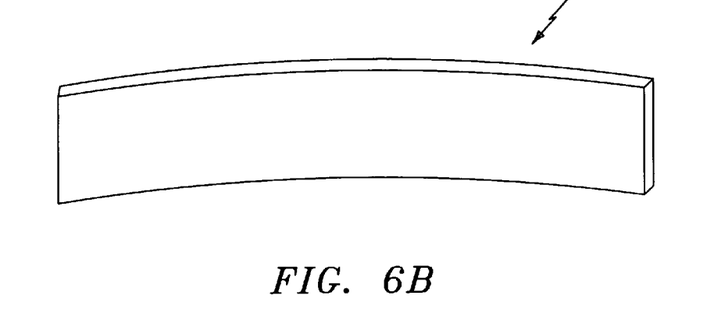

The cage 54 is shown in FIG. 2, and in partial cross-section in FIG. 4. The cage 54 is an originally-flat, rectangular piece of perforated metal (steel or other metal), heavy-gauge metal mesh, or metal lattice rolled to form a tube. The cage 54 retains its tubular shape via a connector plate 82 (also perforated metal, and curved or bent to match the radius of curvature of the cage) welded between the side ends of the cage 54. Three of the retainer strips 60a–60c are connected to the inner surface of the cage 54 along its top circumferential edge, and the other three retainer strips 60d–60f are connected to the inner surface of the cage 54 along its bottom circumferential edge. The strips 60a–60c and 60d–60f are positioned to lie equidistant (approximately 120°) from one another, and are aligned to lie flush with the top and bottom edges of the cage 54, respectively. As shown in FIGS. 6A and 6B, the retainer strips 60a–60f are originally flat, rectangular strips of metal (FIG. 6A) bowed to match the radius of curvature of the cage 54 (FIG. 6B). The strips 60a–60f, besides their function as part of the cap attachment system, serve to reinforce and maintain the shape of the cage 54. Each retainer strip 60a–60f has a shoulder 83 (see FIG. 3) facing away from its respective end of the cage 54.

Figure 3:
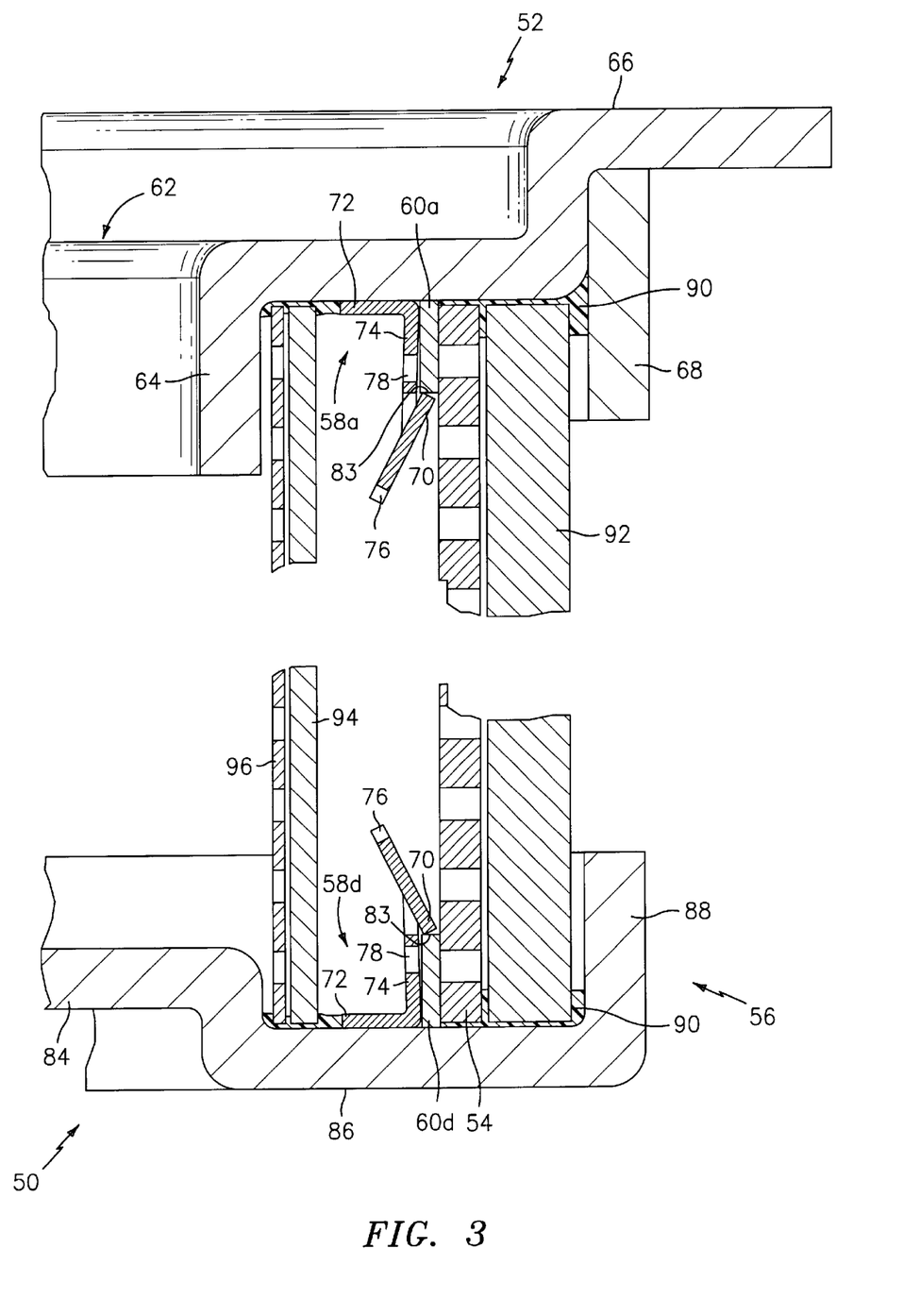
FIG. 3 is a cross-sectional view of the air/oil separator taken along line 3—3 in FIG. 2.

The metal end cap 56 is shown in FIG. 2 and in partial cross-section in FIG. 3, and comprises a central pedestal 84; an annular, flat, intermediate portion 86 extending radially outwards from the pedestal 84; and a peripheral, upwardly-extending flange 88. As with the ring top 52, three of the clips 58d–58f are connected to an inner side of the end cap 56. The clips 58d–58f are arranged concentrically, as around a circle, radially outwards from the pedestal 84. The clips 58d–58f are positioned equidistant (approximately 120°) from one another, and so that the flap portion 70 of each clip faces radially outwards. The clips 58d–58f connected to the end cap 56 are positioned the same distance from the longitudinal axis of the separator 50 as the clips 58a–58c connected to the ring top 52, so that the clips will respectively engage the retainer strips 60a–60f (which are all spaced the same distance from the axis because of the cylindrical shape of the cage 54).

Turning now to FIG. 3, to assemble the air/oil separator 50, epoxy 90 is applied to the area of the ring top 52 between the inner annular flange 64 and the outer skirt 68. Then, the clips 58a–58c are aligned with the strips 60a–60c, and the top end of the cage 54 is brought to bear against the ring top 52. As the cage 54 is moved towards the ring top 52, leading edges of the retainer strips 60a–60c contact the flaps 70 of the clips 58a–58c, forcing the flaps 70 and/or the bodies 74 momentarily inwards. Once the retainer strips 60a–60c pass the flaps 70, the flaps 70 spring outwards, locking the retainer strips 60a–60c between the flaps 70 and the ring top 52, and locking the cage 54 to the ring top 52. This creates a direct, mechanical, metal-to-metal contact between the clips and the strips, and thus between the ring top 52 and the cage 54.

Once the cage 54 is attached to the ring top 52, an outer, coalescing filter or separator 92 for separating oil from air (many of which are commonly available) is concentrically disposed about the outer periphery of the cage 54. The outer separator 92 may be a pleated separator, a tubular or cylindrical separator, or any other type of separator as desired. The outer separator 92 is positioned so that its upper end abuts or is proximate the ring top 52, keeping in mind that the outer separator 92 will become mired in the epoxy 90. Additionally, an inner drain coalescing filter or separator 94 (typically having its own wire-mesh support cage 96), for further separating oil from air and for facilitating oil drainage, is likewise concentrically positioned inside the cage 54, just radially outwards from the ring cap's central annular flange 64. Other filter or separator stages (not shown) may be provided, in addition to or in place of the ones mentioned above, depending on the particular application or use for the separator 50.

To connect the end cap 56 to the rest of the separator 50, epoxy 90 is applied to the intermediate portion 86 of the end cap 56, the clips 58d–58f are aligned with the strips 60d–60f, and the end cap 56 is snapped into place (e.g., the clips engage the retainer strips, as described above with respect to the ring top). Subsequently, the bottom ends of the outer separator 92 and inner separator 94 lie mired in the epoxy 90 against or proximate the end cap 56. The epoxy 90 provides a seal between the ends of the various filter or separator elements and the ring top and end cap. This prevents any of the air/oil aerosol from bypassing the separators.

Once the above-described clips 58a–58f and retaining strips 60a–60f are engaged, with the various metal parts of the air/oil separator being positively locked together, the separator 50 is highly resistant to pressure backlash. More specifically, if the separator is subjected to a significant pressure differential, the high pressure internal to the separator actually presses the clips against the retainer strips, further enhancing the retaining connection there between, and further preventing the end cap 56 from blowing off.

The bent-back, guide flange portions 76 of the clips 58a–58f help to self-align and guide the cage 54 as it is brought into contact with the ring top 52 and end cap 56. More specifically, if the cage 54 is slightly off-center, it will strike at least one of the guide flanges 76, whose slope will cause the cage 54 to move into proper alignment as it slides there along.

As will be appreciated by those of skill in the mechanical arts, all the direct metal-to-metal connections described herein (e.g., the clips 58a–58f connected to the ring top 52 and end cap 56, and the retainer strips 60a–60f connected to the cage 54) may be realized by using any of a number of standard welding methods, or any other appropriate methods or devices as desired. For example, rivets, nuts and bolts, and other mechanical connectors could be used.

As previously mentioned, the use of the above-described clips 58a–58f and retainer strips 60a–60f will result in the ring top 52, cage 54, and end cap 56 being locked together subsequent assembly. More specifically, the ring top, cage, and end cap will not be detachable without a special tool or the use of significant force. This enhances structural robustness, and also comports with the fact that air/oil separators, by their nature, are typically disposable. However, it should be appreciated that "springier," more flexible clips (such as the clips shown in FIGS. 4 and 5 provided in a lighter-gauge metal) could be used instead, if there was some potential reason for the separator to be disassembled, without departing from the spirit and scope of the invention.

Figure 7A:
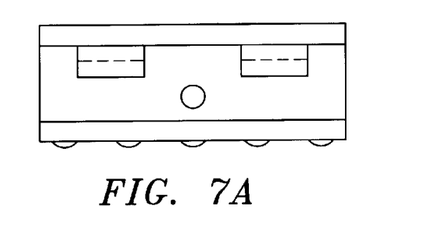
FIGS. 7A–7E show alternative embodiments of the present invention.
Figure 7B:
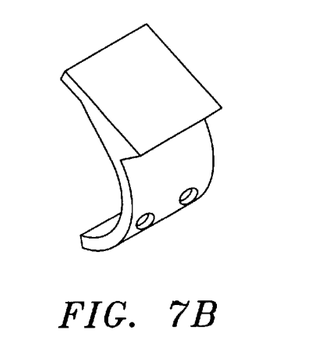

Other structural modifications may also be apparent to those skilled in the art. For example, although the cap attachment system of the present invention has been illustrated as having three clips on each of the ring top and end cap, two clips, or more than three clips, could be used instead without departing from the spirit and scope of the invention. Additionally, the clips could be wider than the ones shown (see FIG. 7B), and could be provided with more than one flap (see FIG. 7A).

Figure 7C:
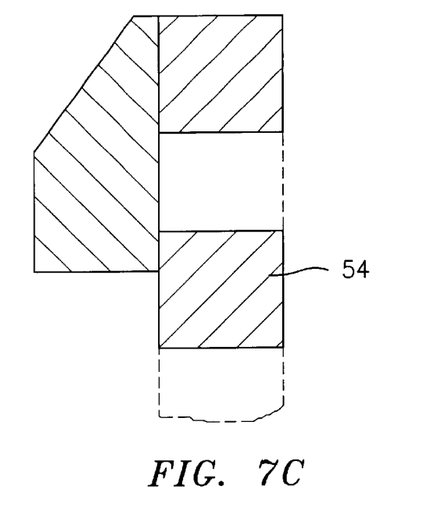

Additionally, although the cap attachment system of the present invention has been illustrated as having three retainer strips on each end of the cage, retainer "rings" could be used instead (e.g., each end of the cage would have a retainer ring instead of three strips), without departing from the spirit and scope of the invention. Also, the retainer strips could be wider, narrower, taller, thicker, etc., than the ones shown in FIG. 6B, and they could be tapered (see FIG. 7C) to further facilitate passage of the clips. Furthermore, the retainer strips do not necessarily have to have square shoulders, as long as they provide some surface to which the clips can engage. It should also be appreciated that the retainer strips could be eliminated altogether, with appropriately positioned and dimensioned grooves being machined into the cage to provide shoulders for the clips to engage, and with the clips being correspondingly repositioned slightly to engage the grooves.

Figure 7D:
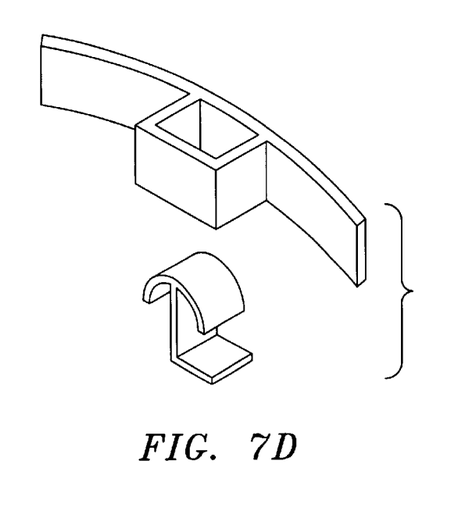
Figure 7E:
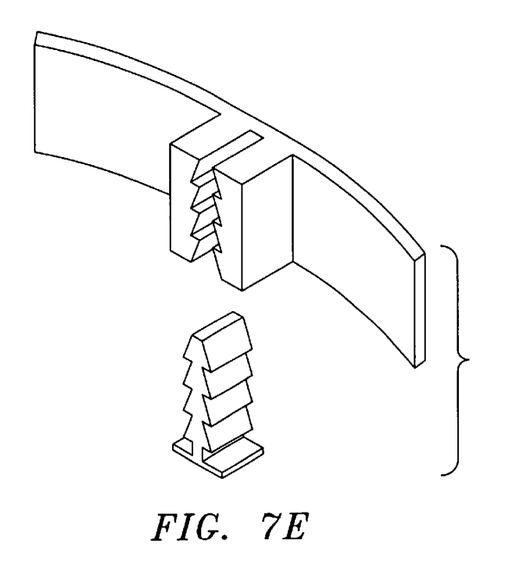

Although the cap attachment system of the present invention has been illustrated as having clips with flaps on one side, and bar-like retainer strips, more complex clips and retainer strips could be provided instead, without departing from the spirit and scope of the invention. For example, as shown in FIGS. 7D and 7E, the retainer "strips" could be provided with retaining slots or the like for receiving barb-like, two-sided clips.

Furthermore, although the cap attachment system of the present invention has been illustrated as having retainer strips on the inside of the cage and clips with radially outwards-facing flaps, the strips could be placed on the outer surface of the cage, with the clips correspondingly positioned to have their flaps facing inwards.

Additionally, although the cap attachment system of the present invention has been illustrated as having retainer strips or rings aligned with the lower and upper circumferential edges of the cage, one of ordinary skill in the art will appreciate that the retainer members could be located away from the edges of the cage, with the clips being correspondingly "taller" to properly engage the retainer members.

Although the cap attachment system of the present invention has been illustrated for use with air/oil separators for oil-lubricated screw-type air compressors, the cap attachment system could be used in any type of filter (e.g., a filter for an air purifier or a vacuum), without departing from the spirit and scope of the invention. Furthermore, the various elements of the cap attachment system could be made of plastic or other non-metal materials, depending on the requirements and intended use of the particular filter.

Since certain changes (including those listed above) may be made in the above described air/oil cap attachment system, without departing from the spirit and scope of the invention herein involved, it is intended that all of the subject matter of the above description or shown in the accompanying drawings shall be interpreted merely as examples illustrating the inventive concept herein and shall not be construed as limiting the invention.

Having thus described the invention, what is claimed is:

1. An air/oil separator comprising:
   a. a perforated metal cylinder having an upper end defining an upper circumferential edge and a lower end defining a lower circumferential edge;
   b. a metal end cap abutting the lower end of the perforated cylinder;
   c. at least one lower metal retainer member electrically connected to the perforated cylinder;
   d. at least two lower metal clips electrically connected to the end cap, wherein the lower metal clips engage the lower retainer member to hold the end cap against the perforated cylinder and to provide an electrical connection between the lower clips and lower retainer member, and, thereby, an electrical connection between the end cap and perforated cylinder;
   e. a metal ring top abutting and covering the upper end of the perforated cylinder;
   f. at least one upper metal retainer member electrically connected to the perforated cylinder; and
   g. at least two upper metal clips electrically connected to the ring top, wherein:
   h. the upper metal clips engage the upper retainer member to hold the ring top against the perforated cylinder and to provide an electrical connection between the upper metal clips and the upper retainer member, and, thereby, an electrical connection between the ring top and perforated cylinder; and
   i. the end cap, perforated cylinder, and ring top are electrically grounded when the ring top is suitably electrically connected to an electrical ground.

2. An air/oil separator comprising:
   a. a perforated metal cylinder having an interior, an upper end defining an upper circumferential edge and an upper opening, and a lower end defining a lower circumferential edge and a lower opening;
   b. a separator element concentrically positioned against the perforated cylinder;
   c. a metal end cap abutting and covering the lower end of the perforated cylinder, the lower opening of the perforated cylinder, and a lower end of the separator element;
   d. at least one lower metal retainer member electrically connected to the perforated cylinder;
   e. at least two lower metal clips electrically connected to the end cap, wherein the lower metal clips engage the lower retainer member to hold the end cap against the perforated cylinder and to provide an electrical connection between the lower clips and lower retainer member, and, thereby, an electrical connection between the end cap and perforated cylinder, and wherein the lower clips are spaced apart and positioned so that pressure in the interior of the perforated cylinder causes the lower clips to further press against and engage the lower retainer member;
   f. a metal ring top abutting and covering the upper end of the perforated cylinder and an upper end of the separator element;
   g. at least one upper metal retainer member electrically connected to the perforated cylinder; and
   h. at least two upper metal clips electrically connected to the ring top, wherein:
   i. the upper metal clips engage the upper retainer member to hold the ring top against the perforated cylinder and to provide an electrical connection between the upper metal clips and the upper retainer member, and, thereby, an electrical connection between the ring top and perforated cylinder;
   j. the end cap, perforated cylinder, and ring top are electrically grounded when the ring top is suitably electrically connected to an electrical ground; and k. the upper clips are spaced apart and positioned so that pressure in the interior of the perforated cylinder causes the upper clips to further press against and engage the upper retainer member.

3. An air/oil separator comprising:

a. a perforated metal cylinder having an inner surface, an outer surface, an interior, an upper end defining an upper circumferential edge and an upper opening, and a lower end defining a lower circumferential edge and a lower opening;

b. a separator element concentrically positioned over the outer surface of the perforated cylinder;

c. a metal end cap abutting and covering the lower end of the perforated cylinder, the lower opening of the perforated cylinder, and a lower end of the separator element;

d. at least one lower metal retainer member electrically connected to the inner surface of the perforated cylinder proximate the lower end thereof;

e. at least two lower metal clips electrically connected to the end cap, wherein the lower metal clips engage the lower retainer member to lock the end cap against the perforated cylinder and to provide an electrical connection between the lower clips and lower retainer member, and, thereby, an electrical connection between the end cap and perforated cylinder, and wherein the lower clips are spaced apart and positioned so that pressure in the interior of the perforated cylinder causes the lower clips to further press against and engage the lower retainer member;

f. a metal ring top abutting and covering the upper end of the perforated cylinder and an upper end of the separator element;

g. at least one upper metal retainer member electrically connected to the inner surface of the perforated cylinder proximate the upper end thereof; and h. at least two upper metal clips electrically connected to the ring top, wherein:

i. the upper metal clips engage the upper retainer member to lock the ring top against the perforated cylinder and to provide an electrical connection between the upper metal clips and the upper retainer member, and, thereby, an electrical connection between the ring top and perforated cylinder;

j. the end cap, perforated cylinder, and ring top are electrically grounded when the ring top is suitably electrically connected to an electrical ground; and k. the upper clips are spaced apart and positioned so that pressure in the interior of the perforated cylinder causes the upper clips to further press against and engage the upper retainer member.

4. The air/oil separator of claim 3 wherein the at least two lower metal clips and the at least two upper metal clips each comprise:

a. a base;

b. a body connected to the base at substantially a right angle;

c. a guide flange connected to an end of the body away from the base and bent back towards the base; and d. a flap connected to a middle bottom of the guide flange and generally aligned therewith.

5. The air/oil separator of claim 3 wherein:

a. the at least one lower metal retainer member comprises three lower retainer strips spaced apart from one another;

b. there are three lower metal clips, said three lower metal clips being spaced apart to respectively engage the three lower retainer strips;

c. the at least one upper metal retainer member comprises three upper retainer strips spaced apart from one another; and d. there are three upper metal clips, said three upper metal clips being spaced apart to respectively engage the three upper retainer strips.

6. The air/oil separator of claim 5 wherein the lower retainer strips and upper retainer strips each comprise a rectangular solid bowed to match a radius of curvature of the perforated cylinder.

7. The air/oil separator of claim 5 wherein the three lower metal clips and three upper metal clips each comprise:

a. a base;

b. a body connected to the base at substantially a right angle;

c. a guide flange connected to an end of the body away from the base and bent back towards the base; and d. a flap connected to a middle bottom of the guide flange and generally aligned therewith.

8. The air/oil separator of claim 5 wherein the three lower retainer strips are spaced substantially equidistantly apart from one another, and the three upper retainer strips are spaced substantially equidistantly apart from one another.

\* \* \* \* \*